US012557935B2

(12) United States Patent (10) Patent No.: US 12,557,935 B2

Yeh (45) Date of Patent: Feb. 24, 2026

(54) COFFEE GRINDER

(71) Applicant: Chuang-Kang Machinery Technology Co., Ltd., New Taipei City (TW)

(72) Inventor: Hsiang-Chen Yeh, New Taipei City (TW)

(73) Assignee: Chuang-Kang Machinery Technology Co., Ltd., New Taipei City (TW)

( * ) Notice: Subject to any disclaimer, the term of this patent is extended or adjusted under 35 U.S.C. 154(b) by 938 days.

(21) Appl. No.: 17/826,714

(22) Filed: May 27, 2022

(65) Prior Publication Data

US 2023/0329477 A1 Oct. 19, 2023

(30) Foreign Application Priority Data

Apr. 18, 2022 (TW) ................................ 111203945

(51) Int. Cl.
| | |
|---|---|
| *A47J 31/44* | (2006.01) |
| *A47J 31/42* | (2006.01) |
| *A47J 42/38* | (2006.01) |

(52) U.S. Cl.
CPC ........... *A47J 31/4403* (2013.01); *A47J 31/42* (2013.01); *A47J 42/38* (2013.01)

(58) Field of Classification Search
CPC ........ A47J 31/00; A47J 31/4403; A47J 31/42; A47J 42/00; A47J 42/38; A47J 43/044;

(Continued)

(56) References Cited

U.S. PATENT DOCUMENTS

| | | | |
|---|---|---|---|
| 7,273,005 B2 | 9/2007 | Turi | |
| 8,826,803 B2 | 9/2014 | Mazzer | |

(Continued)

FOREIGN PATENT DOCUMENTS

| | | | |
|---|---|---|---|
| CN | 112806871 A | * | 5/2021 |
| EP | 2286698 A1 | | 2/2011 |

(Continued)

OTHER PUBLICATIONS

Substantive Examination Report mailed to Saudi Arabian Patent Application No. 122440020 on Sep. 1, 2023 with English Translation.

(Continued)

*Primary Examiner* — Steven W Crabb
*Assistant Examiner* — Allison E Helferty
(74) *Attorney, Agent, or Firm* — Rosenberg, Klein & Lee

(57) ABSTRACT

A coffee grinder including a base and a grinding component is provided. The base includes a body part, a first assembly part, and a second assembly part. The first assembly part and the second assembly part are connected to the body part and protrude from one side of the body part. The first assembly part is disposed above the second assembly part and includes a drive shaft. One end of the drive shaft faces the second assembly part. The grinding component includes an outer burr module and an inner burr shaft assembled in the outer burr module. A side surface of the outer burr module is assembled to the second assembly part. The drive shaft of the first assembly part is assembled with one end of the inner burr shaft. One end of the drive shaft drives the inner burr shaft to rotate relative to the outer burr module.

14 Claims, 7 Drawing Sheets

(58) Field of Classification Search
CPC ........ A47J 43/0705; A47J 31/44; A47J 42/46;
A47J 43/046; A47J 43/082
See application file for complete search history.

(56) References Cited

U.S. PATENT DOCUMENTS

| | | | |
|---|---|---|---|
| 9,622,618 B2 | 4/2017 | Steiner | |
| 10,105,009 B2 | 10/2018 | Teahan | |
| 2005/0172821 A1* | 8/2005 | Chen .................. | A47J 31/3676 |
| | | | 99/279 |
| 2017/0112326 A1* | 4/2017 | Ochoa .................. | B01F 35/714 |
| 2018/0125300 A1* | 5/2018 | Lyn ......................... | A47J 42/26 |
| 2020/0060477 A1* | 2/2020 | Nicholson ............... | A47J 42/36 |
| 2021/0353094 A1* | 11/2021 | Beck ....................... | A47J 31/52 |
| 2021/0353102 A1* | 11/2021 | Zhang .................... | A47J 42/46 |

FOREIGN PATENT DOCUMENTS

| | | | |
|---|---|---|---|
| ES | 1054498 U | | 7/2003 |
| KR | 20190120048 A | * | 10/2019 |
| TW | M609318 U | | 3/2021 |
| WO | 2021082215 A1 | | 5/2021 |

OTHER PUBLICATIONS

Examination Report mailed to Corresponding Saudi Arabian Patent Application No. 122440020 dated Jan. 9, 2025 with attached English Translation.

\* cited by examiner

COFFEE GRINDER

This application claims priority of application No. 111203945 filed in Taiwan on 18 Apr. 2022 under 35 U.S.C. § 119; the entire contents of all of which are hereby incorporated by reference.

BACKGROUND

Technical Field

The present disclosure relates to the technical field of coffee bean grinding, particularly to a coffee grinder.

Related Art

Conventional coffee grinders are mostly hard to disassemble and re-assemble, which is not convenient for daily cleaning and maintenance. So, some of the ground coffee powder of the coffee beans would remain in conventional coffee grinders. This would cause the various freshly ground coffee powder to mix with previous residuals, allowing an undesirable taste and odor, with more likely a significant issue of lethal aflatoxin formation due to residual coffee powder accumulated for too long. Once the lethal aflatoxin is mixed with the freshly ground coffee powder, the brewed coffee would have trace amounts of toxins that can cause health problems.

SUMMARY

The embodiments of the present disclosure provide a coffee grinder, in which a grinding component can be assembled through a first assembly part and a second assembly part of a base, and on the drive shaft of the first assembly part and the second assembly part, the grinding component are easy to disassemble and re-assemble, which solves the problem that conventional coffee grinders are hard to disassemble and re-assemble for cleaning and maintenance.

To resolve the abovementioned problems, the present disclosure is accomplished as follows:

The present disclosure provides a coffee grinder, comprising a base and a grinding component. The base comprises a body part, a first assembly part, and a second assembly part. The first assembly part and the second assembly part are connected to the body part and protrude from one side of the body part. The first assembly part is disposed above the second assembly part. The first assembly part comprises a drive shaft. One end of the drive shaft faces the second assembly part. The grinding component comprises an inner burr shaft and an outer burr module. The inner burr shaft is assembled in the outer burr module. A side surface of the outer burr module is assembled to the second assembly part. The drive shaft of the first assembly part is connected to one end of the inner burr shaft. One end of the drive shaft drives the inner burr shaft to rotate relative to the outer burr module to perform grinding through the cooperation of the inner burr shaft and the outer burr module.

In one embodiment, the drive shaft comprises a drive rod, a fixing sleeve, and an elastic component. The fixing sleeve is sleeved on the drive rod. The elastic component is assembled between the drive rod and the fixing sleeve. One end of the elastic component is pressed against the drive rod. The other end of the elastic component is pressed against the fixing sleeve. One end of the fixing sleeve is engaged with the end of the inner burr shaft.

In one embodiment, the second assembly part comprises an inner fixing member and an outer fixing member. The inner fixing member is disposed at the body part. The grinding component is engaged with the inner fixing member. The outer fixing member is clamped to an outer side of the grinding component. The outer fixing member is connected to the inner fixing member.

In one embodiment, the inner fixing member comprises an inner fixing configuration. The outer fixing member comprises an outer fixing configuration. An outer side of the outer burr module of the grinding component comprises a tool fixing configuration. The inner fixing configuration and the outer fixing configuration are mutually connected and fixed with respect to the tool fixing configuration, respectively.

In one embodiment, the inner fixing configuration and the outer fixing configuration are a plurality of fixing bumps. The tool fixing configuration is a plurality of fixing recesses. The fixing bumps are embedded in the fixing recesses.

In one embodiment, the outer burr module of the grinding component, the inner fixing member, and the outer fixing member are magnetically held together.

In one embodiment, a grinding space exists between the inner burr shaft and the outer burr module. The first assembly part comprises a feeding port. The feeding port corresponds to the grinding space.

In one embodiment, an outer periphery of the other end of the inner burr shaft comprises a first grinding part. An inner periphery of the outer burr module comprises a second grinding part. The first grinding part is opposite to the second grinding part. The first grinding part comprises an bevel teeth. The second grinding part comprises an annular teeth. A grinding gap exists between the bevel teeth and the annular teeth. The grinding space communicates with the grinding gap.

In one embodiment, the grinding component further comprises an adjusting member. The adjusting member is sleeved on the inner burr shaft and linked with the outer burr module. Wherein, rotating the adjusting member to rotate in linking with the outer burr module while the inner burr shaft is fixed and does not rotate. The outer burr module can adjust the distance of the grinding gap between the annular teeth and the bevel teeth.

In one embodiment, the coffee grinder further comprises a discharging member. The discharging member comprises a discharging port. The discharging member is assembled to the bottom of the grinding component. The discharging port of the discharging member corresponds to the grinding gap.

In one embodiment, wherein the grinding component and the discharging member are mutually fixed magnetically.

In one embodiment, the coffee grinder further comprises an accommodating member. The base comprises a base part disposed at one side of the body part. The base part is disposed below the second assembly part. The accommodating member is disposed at the base part. An accommodating groove of the accommodating part corresponds to the discharging port.

In one embodiment, the coffee grinder further comprises a guiding member. The guiding member comprises a guiding channel. The guiding member is assembled between the first assembly part and the grinding component. The feeding port is communicating with one end of the guiding channel. The other end of the guiding channel is communicating with the grinding space.

In one embodiment, the guiding member comprises a plurality of fixing bumps. The body part comprises a plurality of fixing grooves. The fixing bumps are embedded in the fixing grooves.

In one embodiment, the coffee grinder further comprises a driving component and a gear component. The driving component is disposed in the body part. The gear component is disposed in the first assembly part. The driving component is linked with the gear component. The gear component is linked with the drive shaft.

In one embodiment, the coffee grinder further comprises a feeding funnel. A funnel nozzle of the feeding funnel is assembled to the feeding port of the base.

The present disclosure provides a coffee grinder, in which the grinding component tends to be easy dissembled and re-assembled to the first assembly part and the second assembly part, as the grinding component is fixed by the second assembly part of the base, and the drive shaft of the first assembly part assembles and drives the grinding component, In this way, it would facilitate the grinding of coffee beans and the cleaning and maintenance of the grinder.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments are believed to be novel, and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to." "Substantial/substantially" means, within an acceptable error range, the person skilled in the art may solve the technical problem in a certain error range to achieve the basic technical effect. The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
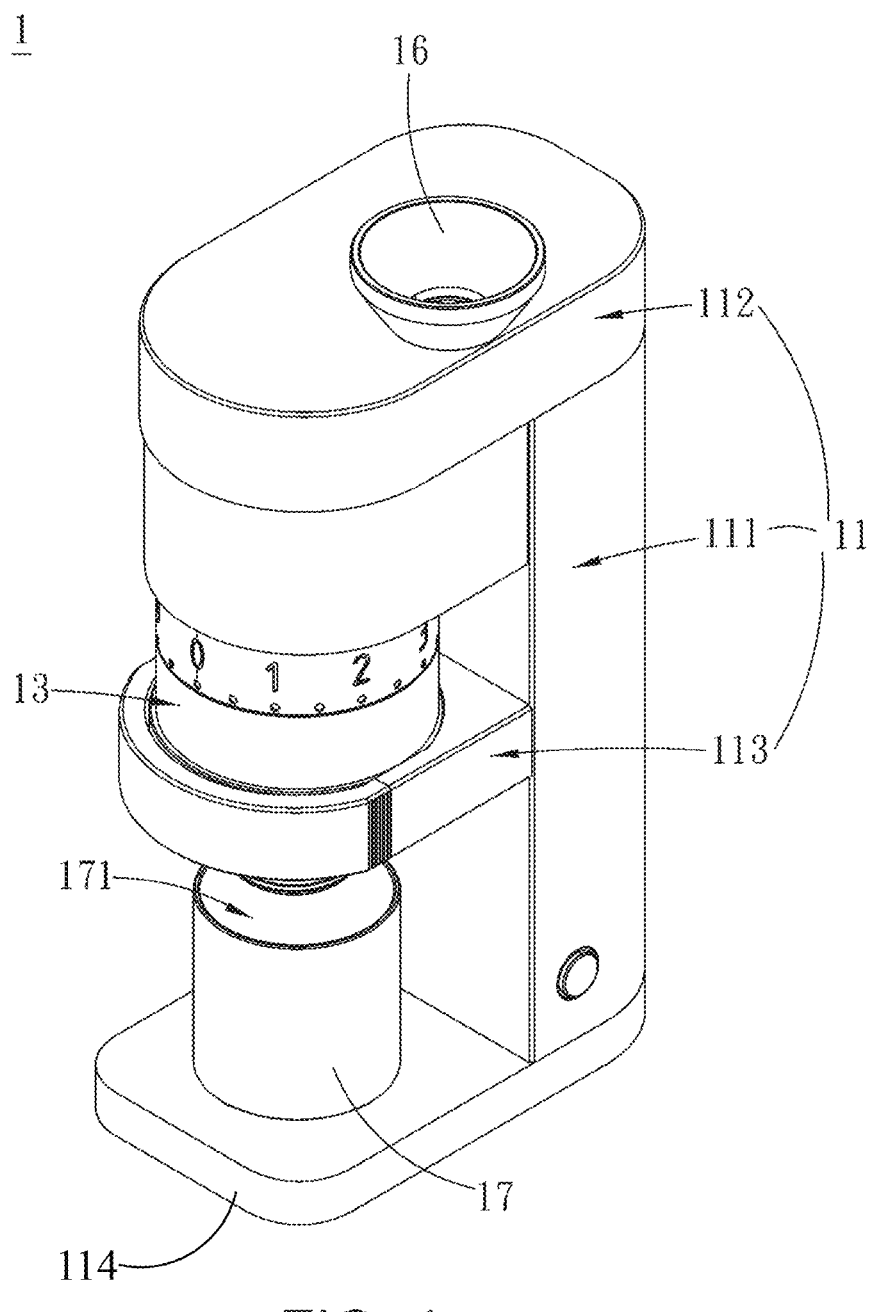
FIG. 1 is a perspective view of a coffee grinder of the present disclosure.
Figure 2:
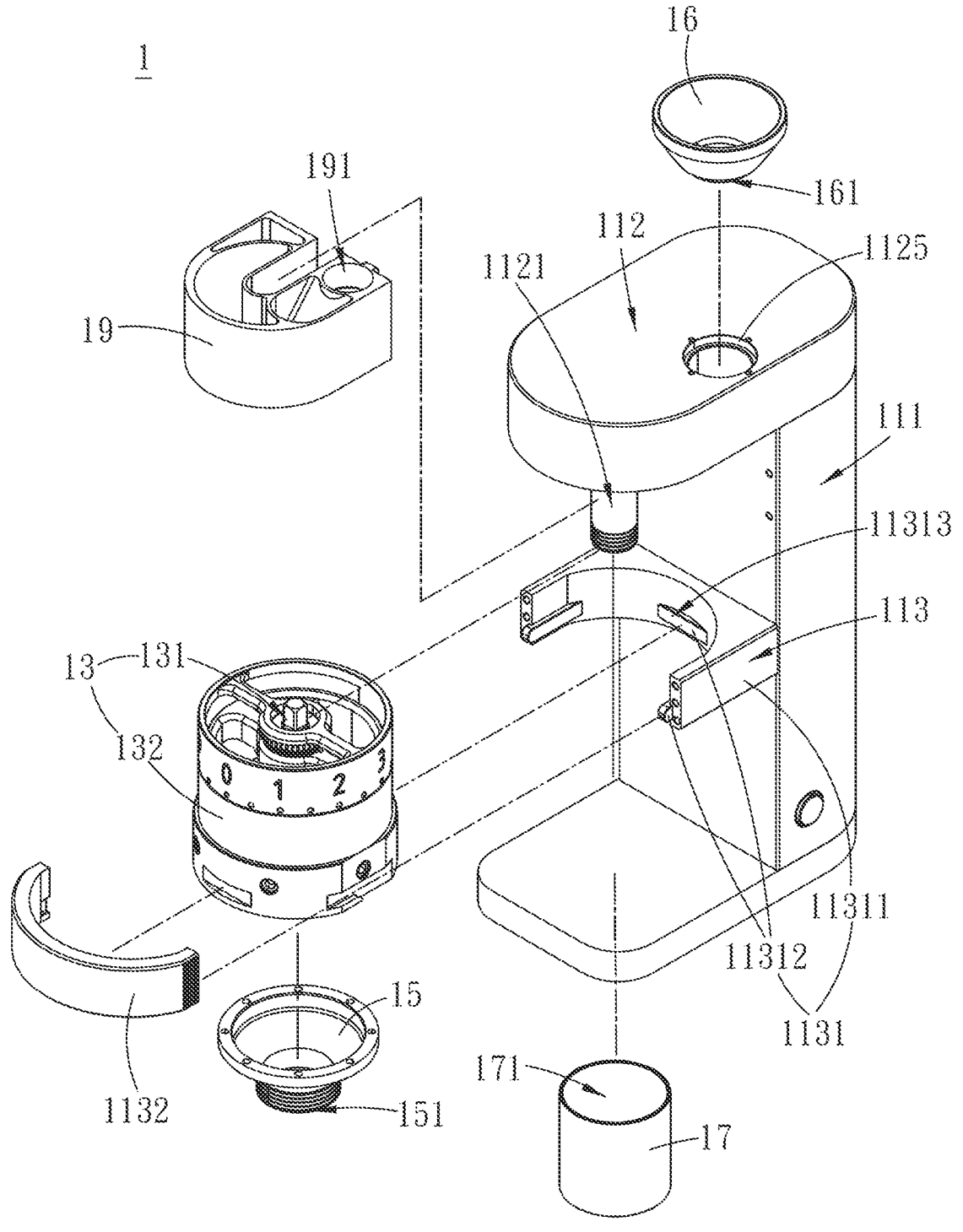
FIG. 2 is an exploded view of the coffee grinder of the present disclosure.
Figure 3:
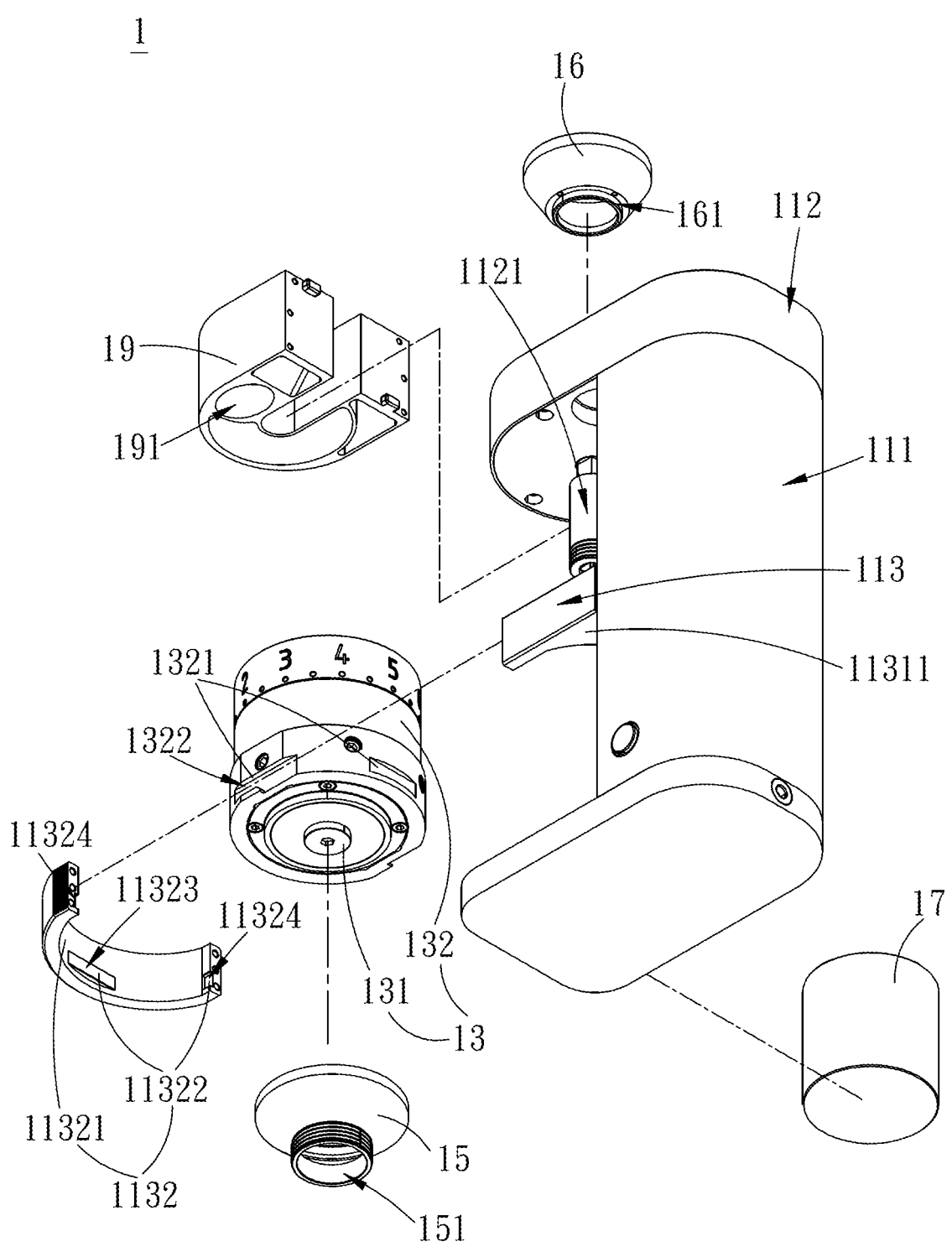
FIG. 3 is another exploded view of the coffee grinder of the present disclosure.

FIG. 1 is a perspective view of a coffee grinder of the present disclosure. FIG. 2 and FIG. 3 are exploded views of the coffee grinder of the present disclosure. As shown in the figures, this embodiment provides a coffee grinder 1, which comprises a base 11 and a grinding component 13. The base 11 comprises a body part 111, a first assembly part 112, and a second assembly part 113. The first assembly part 112 and the second assembly part 113 are connected to the body part 111 and protrude from one side of the body part 111. The first assembly part 112 is disposed above the second assembly part 113. The first assembly part 112 comprises a drive shaft 1121. One end of the drive shaft 1121 faces the second assembly part 113. The grinding component 13 comprises an inner burr shaft 131 and an outer burr module 132. The inner burr shaft 131 is assembled in the outer burr module 132. A side surface of the outer burr module 132 is assembled to the second assembly part 113. The drive shaft 1121 of the first assembly part 112 is connected to the inner burr shaft 131. One end of the drive shaft 1121 drives the inner burr shaft 131 to rotate relative to the outer burr module 132 to perform grinding through the cooperation of the inner burr shaft 131 and the outer burr module 132. In this embodiment, the side surface of the outer burr module 132 is disposed between a top surface and a bottom surface of the outer burr module 132.

Figure 4:
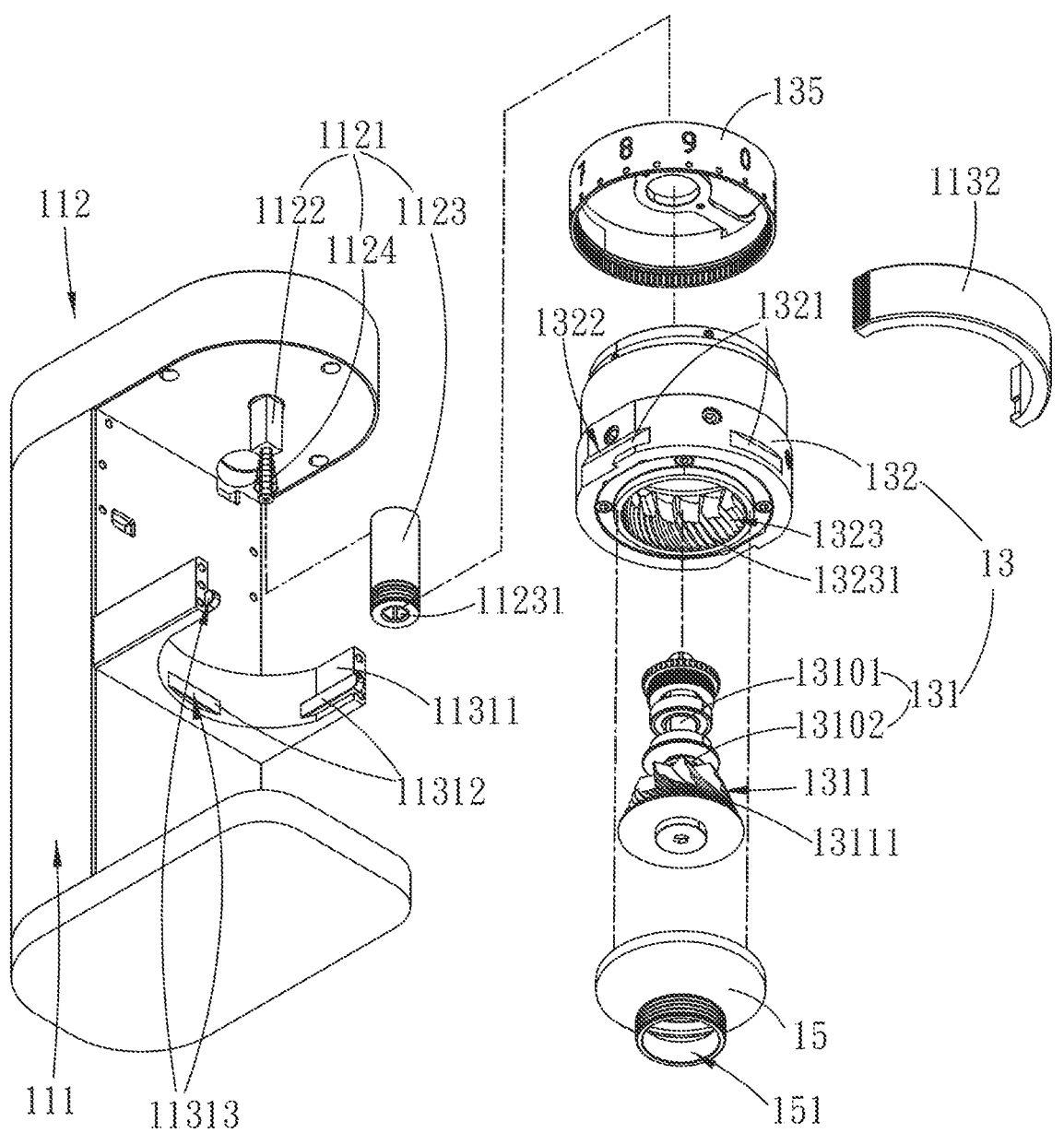
FIG. 4 is an exploded view of a grinding component, a first assembly part, and a second assembly part of the present disclosure.
Figure 5:
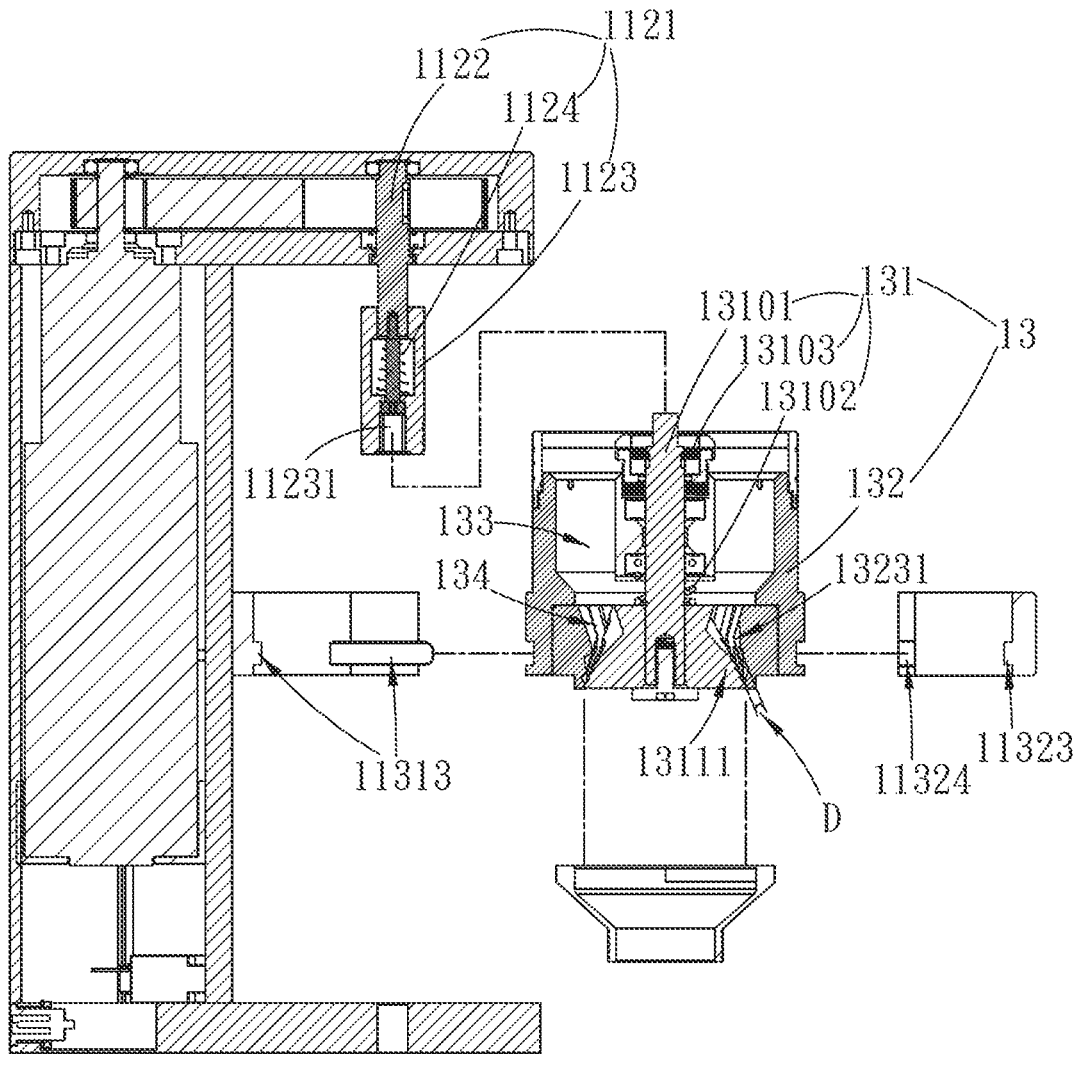
FIG. 5 is a cross-sectional view of the grinding component, the first assembly part, and the second assembly part of the present disclosure.

FIG. 4 is an exploded view of a grinding component, a first assembly part, and a second assembly part of the present disclosure. FIG. 5 is a cross-sectional view of the grinding component, the first assembly part, and the second assembly part of the present disclosure. As shown in the figures, in this embodiment, the drive shaft 1121 of the first assembly part 112 comprises a drive rod 1122, a fixing sleeve 1123, and an elastic component 1124. The fixing sleeve 1123 is sleeved on the drive rod 1122, the elastic component 1124 is assembled between the drive rod 1122 and the fixing sleeve 1123, one end of the elastic component 1124 is pressed against the drive rod 1122, the other end of the elastic component 1124 is pressed against the fixing sleeve 1123, and one end of the fixing sleeve 1123 is clamped to one end of the inner burr shaft 131. Wherein one end of the fixing sleeve 1123 comprises a connecting groove 11231, the shape of recessing groove of the connecting groove 11231 matches with one end of the inner burr shaft 131, and one end of the inner burr shaft 131 is embedded in the connecting groove 11231.

Back to FIG. 2 and FIG. 3 again, the second assembly part 113 comprises an inner fixing member 1131 and an outer fixing member 1132. The inner fixing member 1131 is disposed at the body part 111, the outer burr module 132 of the grinding component 13 is engaged with the inner fixing member 1131, the outer fixing member 1132 is clamped to an outer side of the outer burr module 132 of the grinding component 13, and the outer fixing member 1132 is connected to the inner fixing member 1131. Wherein, the inner fixing member 1131 comprises an inner frame 11311 and an inner fixing configuration 11312, and the inner fixing configuration 11312 is disposed on an inner side of the inner frame 11311, the outer fixing member 1132 comprises an outer frame 11321 and an outer fixing configuration 11322, the outer fixing configuration 11322 is disposed on an inner side of the outer frame 1132, the outer side of the outer burr module 132 of the grinding component 13 comprises a tool fixing configuration 1321, two ends of the inner frame 11311 and two ends of the outer frame 11321 are mutually connected and fixed, an inner surface of the inner frame 11311 and an inner surface of the outer frame 11321 clamp an outer surface of the outer burr module 132, and the inner fixing configuration 11312 and the outer fixing configuration 11322 are mutually connected and fixed with respect to the tool fixing configuration 1321, respectively.

In this embodiment, the inner fixing configuration 11312 comprises a fixing bump 11313, and the outer fixing configuration 11322 comprises a plurality of fixing bumps 11323. The tool fixing configuration 1321 comprises a plurality of fixing recesses 1322. The fixing bump 11313 of the inner fixing configuration 11312 and the fixing bumps 11323 of the outer fixing configuration 11322 are respectively embedded in the fixing recesses 1322. More specifically, the outer burr module 132 of the grinding component 1, the inner fixing member 1131, and the outer fixing member 1132 are magnetically held together, which facilitates the disassembly and re-assembly for cleaning and maintenance.

In addition, The fixing bump 11313 extends and protrudes from two ends of the inner frame 11311, and the outer fixing configuration 11322 further comprises a fixing recess 11324 disposed at two ends of the outer frame 11321. When the two ends of the inner frame 11311 and the two ends of the outer frame 11321 are mutually connected and fixed, the fixing bump 11313 of the inner fixing configuration 11312 would be embedded in the fixing recess 11324 of the outer fixing configuration 11322 to strengthen the bonding strength between the outer fixing member 1132 and the inner fixing member 1131.

In this embodiment, the grinding component 13 could be first assembled to the second assembly part 113 of the base 11. Wherein, the outer burr module 132 of the grinding component 13 is assembled to the inner fixing member 1131 of the second assembly part 113 correspondingly, then the outer fixing member 1132 is clamped to the outer side of the outer burr module 132 of the grinding component 13, and the outer fixing member 1132 is connected to the inner fixing member 1131. In this way, the grinding component 13 can be clamped in the second assembly part 113. Meanwhile, the fixing sleeve 1123 of the drive shaft 1121 is stretched upwards, so that an inner part of the fixing sleeve 1123 could compress the elastic component 1124. After one end of the inner burr shaft 131 of the grinding component 13 corresponds to a lower part of the drive shaft 1121, no external force would be applied to the fixing sleeve 1123. Then, the connecting groove 11231 at one end of the fixing sleeve 1123 could fix one end of the inner burr shaft 131, so that the inner burr shaft 131 could be embedded in the connecting groove 11231. In this way, the assembly of the grinding component 13, the first assembly part 111, and the second assembly part 113 of the base 11 can be completed.

Back to FIG. 4 and FIG. 5 again, in this embodiment, the grinding component 13 is assembled by the inner burr shaft 131 and the outer burr module 132, where the inner burr shaft 131 is assembled in the outer burr module 132 from the bottom of the outer burr module 132. Wherein, the inner burr shaft 131 comprises a burr shaft 13101, an elastic member 13102, and a fixing member 13103. The elastic member 13102 is sleeved on the burr shaft 13101, and the outer burr module 132 is sleeved on the burr shaft 13101 and the elastic member 13102. After the outer burr module 132 presses the elastic member 13102 of the burr shaft 13101, one end of the burr shaft 13101 would protrude from the top side of the outer burr module 132. Then, by sleeving the fixing member 13103 on the protruding end of the burr shaft 13101, the inner burr shaft 131 and the outer burr module 132 could be assembled and fixed. Conversely, after the fixing member 13103 is removed from the protruding end of the burr shaft 13101, the inner burr shaft 131 and the outer burr module 132 could be disassembled and separated.

Besides, a grinding space 133 exists between the inner burr shaft 131 and the outer burr module 132. The first assembly part 112 comprises a feeding port 1125 corresponding to the grinding space 133. Also, the coffee grinder 1 further comprises a feeding funnel 16, of which a funnel nozzle 161 is assembled to the feeding port 1125 of the base 11. Through the feeding funnel 16, it is more convenient to load the coffee beans into the feeding port 1125.

Moreover, an outer periphery of the other end of the inner burr shaft 131 comprises a first grinding part 1311, and an inner periphery of the outer burr module 132 comprises a second grinding part 1323. The first grinding part 1311 is opposite to the second grinding part 1323. The first grinding part 1311 comprises a bevel teeth 13111, and the second grinding part 1323 comprises an annular teeth 13231. A grinding gap 134 exists between the bevel teeth 13111 and the annular teeth 13231, and the grinding space 133 communicates with the grinding gap 134. The coffee beans can be poured into the grinding space 133 of the grinding component 13 through the feeding port 1125, and then enter the grinding gap 134 from the grinding space 133 to be ground.

The grinding component 13 further comprises an adjusting member 135, which is sleeved on the inner burr shaft 131 and linked with the outer burr module 132. Wherein, rotating the adjusting member 135 to rotate in linking with the outer burr module 132 while the inner burr shaft 131 is fixed and does not rotate. The outer burr module 132 can adjust the distance D of grinding gap 134 between the annular teeth 13231 and the bevel teeth 13111. Wherein, when the outer burr module 132 rotates and moves downward, the annular teeth 13231 would approach the bevel teeth 13111 to shorten the distance D of the grinding gap 134, so the coffee beans would be ground into smaller particles. On the contrary, when the outer burr module 132 rotates and moves upward, the annular teeth 13231 would be away from the bevel teeth 13111 to increase the distance D of the grinding gap 134, so the coffee beans would be ground into larger particles. By implementing the above processes, the particle size of ground coffee beans could be adjusted.

Moreover, the coffee grinder 1 further comprises a discharging member 15 comprising a discharging port 151. The discharging member 15 is assembled to the bottom of the grinding component 13, and the discharging port 151 of the discharging member 15 corresponds to the grinding gap 134. Wherein, the discharging member 15 is in a shape of a funnel. The grinding component 13 and the discharging member 15 are mutually fixed magnetically, to facilitate the disassembly and re-assembly for cleaning and maintenance.

Besides, the coffee grinder 1 further comprises an accommodating member 17. The base 11 comprises a base part 114 disposed at one side of the body part 111. The base part 114 is disposed below the second assembly part 113, the accommodating member 17 is disposed at the base part 114, and an accommodating groove 171 of the accommodating member 17 corresponds to the discharging port 151. The accommodating member 17 accommodates the coffee powder from the coffee beans ground.

Figure 6:
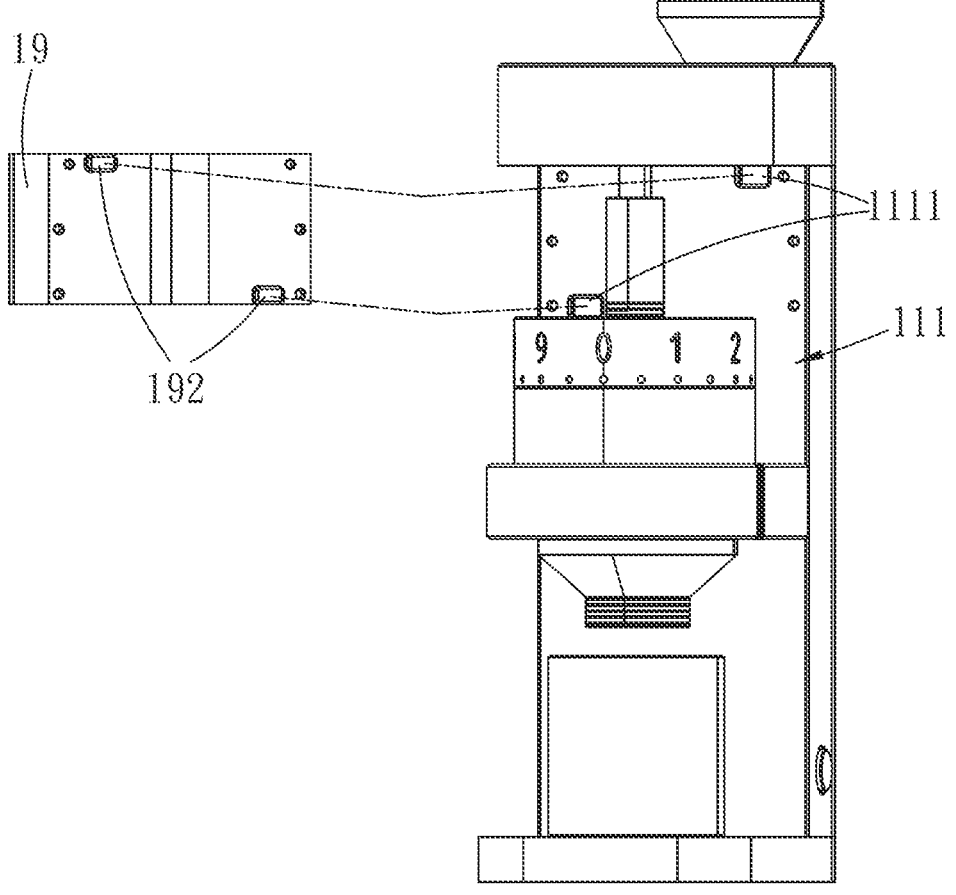
FIG. 6 is a schematic assembly diagram of a guiding member of the present disclosure.

FIG. 6 is a schematic assembly diagram of a guiding member of the present disclosure. As shown in the figure, in this embodiment, the coffee grinder 1 further comprises a guiding member 19 comprising a guiding channel 191. The guiding member 19 is assembled between the first assembly part 112 and the grinding component 13, the feeding port 1125 is connected to one end of the guiding channel 191, and the other end of the guiding channel 191 is communicated with the grinding space 133. Wherein, the guiding member 19 is U-shaped, when the guiding member 19 is assembled between the first assembly part 112 and the grinding component 13, the drive shaft 1121 would be disposed in the U-shaped space inside the guiding member 19 so that the guiding member 19 does not affect the configuration of the drive shaft 1121. Besides, the guiding member 19 comprises a plurality of fixing bumps 192, and the body part 111 comprises a plurality of fixing grooves 1111. The fixing bumps 192 are embedded in the fixing grooves 1111 to enhance the assembly strength of the guiding member 19 with the body part 111 of the base 11.

Figure 7:
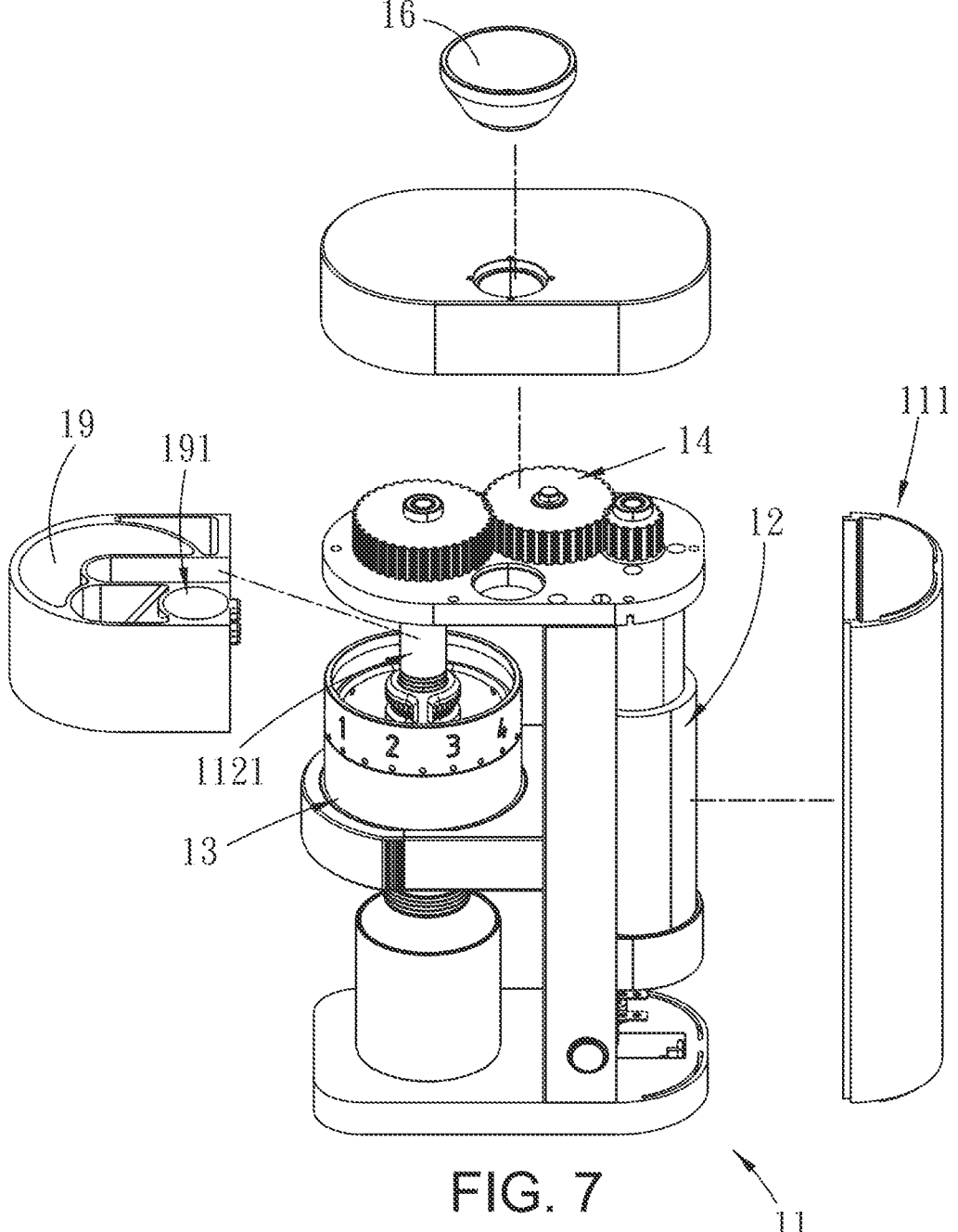
FIG. 7 is a schematic diagram of a driving configuration of the coffee grinder of the present disclosure.

FIG. 7 is a schematic diagram of a driving configuration of the coffee grinder of the present disclosure. As shown in the figure, in this embodiment, the coffee grinder 1 further comprises a driving component 12 and a gear component 14. The driving component 12 is disposed in the body part 111 of the base 11, the gear component 14 is disposed in the first assembly part 112 of the base 11, the driving component 12 is linked with the gear component 14, and the gear component 14 is linked with the drive shaft 1121. Wherein, the driving component 12 is a driving motor, and its axial direction can be parallel to the drive shaft 1121. In this embodiment, the gear component 14 is a spur gear. Since an axial direction of the driving motor of a conventional coffee grinder is perpendicular to the drive shaft, the driving motor and the drive shaft need to be connected by a bevel gear. However, bevel gear would require a greater housing thickness to be accommodated. So, in this embodiment, the driving motor (driving component 12) and the drive shaft 1121 are connected through a transmission design of spur gear (gear component 14) to reduce the volume occupied by the bevel gear of a conventional coffee grinder (that is, as long as the thickness of the first assembly part 112 can accommodate spur gear having the same height).

In summary, embodiments of the present disclosure provide a coffee grinder, in which the grinding component tends to be easy dissembled and re-assembled to the first assembly part and the second assembly part, as the grinding component is fixed by the second assembly part of the base, and the drive shaft of the first assembly part assembles and drives the grinding component, In this way, it would facilitate the grinding of coffee beans and the cleaning and maintenance of the grinder.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A coffee grinder, comprising:

a base comprising a body part, a first assembly part, and a second assembly part, the first assembly part and the second assembly part being connected to the body part and protruding from one side of the body part, the first assembly part being disposed above the second assembly part, the first assembly part comprising a drive shaft, one end of the drive shaft facing the second assembly part;

a grinding component comprising an inner burr shaft and an outer burr module, the inner burr shaft being assembled in the outer burr module, a side surface of the outer burr module being assembled to the second assembly part, the drive shaft of the first assembly part being connected to one end of the inner burr shaft, one end of the drive shaft driving the inner burr shaft to rotate relative to the outer burr module to perform grinding through the cooperation of the inner burr shaft and the outer burr module;

wherein the second assembly part comprises an inner fixing member and an outer fixing member; the inner fixing member is disposed at the body part; the grinding component is engaged with the inner fixing member: the outer fixing member is clamped to an outer side of the grinding component; the outer fixing member is connected to the inner fixing member; and wherein the inner fixing member comprises an inner fixing configuration the outer fixing member comprises an outer fixing configuration; an outer side of the outer burr module of the grinding component comprises a tool fixing configuration; the inner fixing configuration and the outer fixing configuration are mutually connected to and fixed with respect to the tool fixing configuration.

2. The coffee grinder according to claim 1, wherein the drive shaft comprises a drive rod, a fixing sleeve, and an elastic component; the fixing sleeve is sleeved on the drive rod; the elastic component is assembled between the drive rod and the fixing sleeve; one end of the elastic component is pressed against the drive rod; the other end of the elastic component is pressed against the fixing sleeve; one end of the fixing sleeve is engaged with the end of the inner burr shaft.

3. The coffee grinder according to claim 1, wherein the inner fixing configuration and the outer fixing configuration are a plurality of fixing bumps; the tool fixing configuration is a plurality of fixing recesses; the fixing bumps of the inner and outer fixing configuration are embedded in the fixing recesses of the tool fixing configuration.

4. The coffee grinder according to claim 1, wherein the outer burr module of the grinding component, the inner fixing member, and the outer fixing member are magnetically held together.

5. The coffee grinder according to claim 1, wherein a grinding space exists between the inner burr shaft and the outer burr module; the first assembly part comprises a feeding port; the feeding port corresponds to the grinding space.

6. The coffee grinder according to claim 5, wherein an outer periphery of the other end of the inner burr shaft comprises a first grinding part; an inner periphery of the outer burr module comprises a second grinding part; the first grinding part is opposite to the second grinding part; the first grinding part comprises bevel teeth; the second grinding part comprises annular teeth; a grinding gap exists between the bevel teeth and the annular teeth; the grinding space communicates with the grinding gap.

7. The coffee grinder according to claim 6, wherein the grinding component further comprises an adjusting member; the adjusting member is sleeved on the inner burr shaft and linked with the outer burr module; wherein rotating the adjusting member to rotate in linking with the outer burr module while the inner burr shaft is fixed and does not rotate; the outer burr module can adjust the distance of the grinding gap between the annular teeth and the bevel teeth.

8. The coffee grinder according to claim 6 comprising a discharging member, the discharging member comprising a discharging port, the discharging member being assembled to the bottom of the grinding component, the discharging port of the discharging member corresponding to the grinding gap.

9. The coffee grinder according to claim 8, wherein the grinding component and the discharging member are mutually fixed magnetically.

10. The coffee grinder according to claim 8 comprising an accommodating member, the base comprising a base part, the base part being disposed at one side of the body part, the base part being disposed below the second assembly part, the accommodating member being disposed at the base part, an accommodating groove of the accommodating part corresponding to the discharging port.

11. The coffee grinder according to claim 5 comprising a guiding member, the guiding member comprising a guiding channel, the guiding member being assembled between the first assembly part and the grinding component, the feeding port being communicating with being in communication with one end of the guiding channel, the other end of the guiding channel being communicating being in communication with the grinding space.

12. The coffee grinder according to claim 11, wherein the guiding member comprises a plurality of fixing bumps; the body part comprises a plurality of fixing grooves; the fixing bumps of the guiding member are embedded in the fixing grooves of the body part.

13. The coffee grinder according to claim 5 comprising a feeding funnel, a funnel nozzle of the feeding funnel being assembled to the feeding port of the first assembly part.

14. The coffee grinder according to claim 1 comprising a driving component and a gear component, the driving component being disposed in the body part, the gear component being disposed in the first assembly part, the driving component being linked with the gear component, the gear component being linked with the drive shaft.

* * * * *